United States Patent [19]

Kuan

[11] 4,354,001
[45] Oct. 12, 1982

[54] RUBBER SLAB DIP

[75] Inventor: Tiong H. Kuan, Stow, Ohio

[73] Assignee: The General Tire & Rubber Company, Akron, Ohio

[21] Appl. No.: 332,689

[22] Filed: Dec. 21, 1981

Related U.S. Application Data

[62] Division of Ser. No. 212,788, Dec. 4, 1980, Pat. No. 4,331,738.

[51] Int. Cl.$^3$ .............................................. C08L 13/02
[52] U.S. Cl. ..................................... 524/501; 524/522
[58] Field of Search ................................ 524/501, 522

[56] References Cited

U.S. PATENT DOCUMENTS

| | | | |
|---|---|---|---|
| 3,513,121 | 5/1970 | Heaton | 524/501 |
| 3,956,218 | 5/1978 | Keppler et al. | 524/501 |
| 4,217,395 | 8/1980 | Kuan et al. | 428/520 |

Primary Examiner—Joseph L. Schofer
Assistant Examiner—N. Sarofim

[57] ABSTRACT

A composition of a blend of a carboxylated copolymer latex and an acrylate copolymer latex containing a minor amount by weight of a heat sensitizer sufficient to gel the composition and which also can contain fillers, wetting agents and stabilizers, and so forth can be used to provide a water resistant film on the surface of a hot rubber compound or composition which subsequently can be cooled rapidly with water and dried. The resulting latex coated rubber can then be stacked or assembled without sticking.

3 Claims, No Drawings

RUBBER SLAB DIP

This is a division of application Ser. No. 212,788 filed Dec. 4, 1980, now U.S. Pat. No. 4,331,738.

This invention relates to a dip for rubber to prevent the surfaces of the rubber from sticking together.

BACKGROUND

In U.S. Pat. No. 4,217,395 and U.S. copending patent application Ser. No. 093,771 filed Nov. 13, 1979, now abandoned there is disclosed a process for preventing the surfaces of a hot, sticky rubber compound from sticking together by coating them with a water resistant, heat sensitized carboxylated copolymer latex composition so that the rubber can be cooled with water, dried and stacked in layers without sticking together. This improves the production of rubber compounds from a Banbury and the handling of these compounds in factory operations. These carboxylated copolymer compositions generally contain fillers such as clay which may produce dusting on drying and handling. Reduction in the filler to avoid dusting may impair the release properties of the coating.

Accordingly, it is an object of the present invention to provide a composition and method for coating a hot, sticky rubber compound with a water resistant composition so that the rubber compound may be cooled with water, dried and stacked without sticking together and with a reduced amount of dusting.

These and other objects and advantages of the present invention will become more apparent to those skilled in the art from the following detailed description and working example.

STATEMENT OF THE INVENTION

According to the present invention it has been found that a blend of a carboxylated copolymer latex and an acrylate copolymer latex containing a minor amount by weight of a heat sensitizer sufficient to gel the polymer particles of the latices on the application of heat, preferably containing also fillers, stabilizers and wetting agents, can be used, to form an adherent water resistant coating on a hot rubber surface which subsequently can be water cooled, by dipping, preferably by spraying, dried and assembled without danger of the rubber (layers) sticking to itself. The film formed on heat drying resists removal by water spray. Film formation is believed due to the heat from the freshly mixed (milled or worked) rubber. The film is adherent to the rubber and prevents layers of rubber from sticking together. Also, any filler in the rubber latex is effectively bound by the carboxylated and acrylate polymers on drying so that dusting does not occur to any appreciable extent when a filler is present in the coating and so that clean-up problems are reduced. In fact, a feature of the present composition and method is that a reduced amount of filler can be used with achievement of satisfactory results. The use of the present process, also, provides a method for increasing the production of a Banbury.

DISCUSSION OF DETAILS AND PREFERRED EMBODIMENTS

The carboxylated copolymer is prepared by free radical aqueous emulsion copolymerization. It should be capable of forming an essentially non-tacky, essentially water insoluble film when cast as a latex and dried, and the copolymer per se should be sulfur vulcanizable and have a glass transition temperature (Tg) of not less than about $-30°$ C. The carboxylated copolymer contains (1) at least 545% by weight of styrene, vinyl toluene, acrylonitrile, methacrylonitrile, acrylamide, methacrylamide, methylmethacrylate, or ethyl methacrylate or mixture thereof. (2) up to 10% by weight of a copolymerizable acidic monomer like acrylic acid, methacrylic acid, ethacrylic acid, maleic acid, fumaric acid, itaconic acid, citraconic acid, sorbic acid or crotonic acid or mixture thereof, and (3) the balance a copolymerizable conjugated diene monomer in sufficient amount by weight to afford some flexibility and to provide for vulcanization, crosslinking or curing, e.g., sulfur, or peroxide curing, such as butadiene-1,3, isoprene, 2,3-dimethylbutadiene-1,3, or piperylene or mixture thereof. Very minor amounts of a 4th, 5th etc., monomer such as methyl acrylate, hydroxy ethyl acrylate, and so forth can be copolymerized with the above monomers so long as these additional monomers do not adversely affect the properties of the resulting carboxylated copolymer, the latex blend and/or the rubber compound to which the blend is applied. Methods for making carboxylated polymers are disclosed in U.S. Pat. Nos. 2,604,668; 2,669,550; 2,710,292; 2,724,707; 2,849,426; 2,868,754; 3,392,048; 3,404,116; 3,409,569 and 3,468,833; in "Rubber World," September 1954, pages 784 to 788; and in "Industrial and Engineering Chemistry," May, 1955, pages 1006 to 1012. Mixtures of carboxylated latices may be used. While an ester of the acid or its anhydride etc., can be copolymerized instead of the acid and then hydrolyzed and neutralized to form free acid groups in the copolymer, this procedure is not as convenient as directly copolymerizing the acidic monomer with the other copolymerizable monomers.

The acrylate polymer, also, is prepared by free radical aqueous emulsion copolymerization. It should be capable of forming an essentially non-tacky, essentially water insoluble film when cast with the carboxylated copolymer as a latex blend and dried on the substrate. The acrylate copolymer should have a glass transition temperature (Tg) of not less than about $+30°$ C. The acrylate copolymer comprises a copolymer of (1) from about 50 to 70% by weight of at least one acrylate selected from the group consisting of methyl acrylate and ethyl acrylate, (2) from about 25 to 40% by weight of at least one alkacrylate selected from the group consisting of methyl methacrylate, ethyl methacrylate and methyl ethacrylate and (3) from about 3 to 7% by weight of acrylamide. Very minor amounts of another monomer(s) may be copolymerized with these monomers provided it does not adversely affect the properties of the resulting acrylate copolymer, the latex blend and/or the rubber compound to which the blend is applied. This acrylate copolymer alone as a slab dip does not provide adequate flexibility.

In the latex blend, on a dry weight basis, the carboxylated copolymer is used in an amount of from about 50 to 85% by weight and the acrylate copolymer is used in an amount of from about 50 to 15% by weight.

Polymerization of the monomers to obtain these latices is effected by free-radical catalysts (free-radical formers or free-radical forming systems) such as ammonium, potassium or sodium persulfate, $H_2O_2$ and the like in an amount sufficient for polymerization of the monomers and to obtain the desired molecular weight. Other free-radical catalysts can be used which decompose or become active at the temperature used during polymerization. Examples of some other free-radical catalysts are cumene hydroperoxide, dibenzoyl peroxide, diacetyl peroxide, di-decanoyl peroxide, di-t-butyl peroxide, dilauroyl peroxide, bis-(p-methoxy benzoyl) peroxide, t-butyl, peroxy pivalate, dicumyl peroxide, isopropyl percarbonate, di-sec-butyl peroxydicarbonate, azobis-dimethylvaleronitrile, 2,2'-azobis-isobutyronitrile, 2,2'-azobis-2-methylbutyronitrile and 2,2'-azobis (methylisobutyrate) and the like and mixtures of the same. Only minor amounts of catalysts are necessary to effect polymerization. Free-radical catalysis is well known as shown by "Encyclopedia of Polymer Science and Technology," Interscience Publishers a division of John Wiley and Sons, Inc., New York, Vol. 2 (1965) pages 278–295, Vo. 3 (1965) pages 26–29, Vol. 7 (1967) pages 361–431, and Vol. 9 (1968) pages 814–841.

Emulsifiers such as soaps, surfactants or dispersing agents are used in an amount sufficient to obtain an aqueous emulsion of the water and monomers and resulting copolymers. Examples of some emulsifiers are potassium laurate, potassium stearate, potassium oleate, sodium dodecyl sulfonate, sodium lauryl sulfonate, sodium decyl sulfate and sodium rosinate and the like and mixtures thereof. Other well known surfactants can be used. See, also, "Materials, Compounding Ingredients and Machinery for Rubber," Publ. by "Rubber World," Bill Communications, Inc., New York, 1977, pages 291–294 and "Encyclopedia of Polymer Science and Technology," Vol. 5, 1966.

Chain transfer agents or modifiers are well known in the emulsion copolymerization of vinyl and diene monomers to make copolymers. They are used generally to modify the molecular weight and to reduce cross-linking. While many types have been proposed, it is preferred to use the alkyl and/or aralkyl mercaptans having from 8 to 18 carbon atoms. Of these, the tertiary alkyl mercaptans are much preferred. Examples of some mercaptans are n-octyl mercaptan, n-dodecyl mercaptan, t-octyl mercaptan, t-dodecyl mercaptan, p-tridecyl mercaptan tetradecyl mercaptan, hexadecyl mercaptan and so forth and mixtures thereof. If little or no mercaptan is used and polymerization is continued to completion, gel may occur and the molecular weight can be very high or infinite although some low m.w. fractions may be found. In other words, m.w. may range from 50,000 to 2,000,000 or more.

NaOH, KOH, NH$_4$OH and so forth may be added to the polymerization reactor before, during or after polymerization to control the pH as desired. Polymerization may be conducted under acidic conditions.

The water should be free of deleterious materials, and preferably should be distilled or ion exchanged. Sufficient water is used to enable formation of the emulsion and to enable proper mixing or stirring of the ingredients during polymerization to obtain the desired rate and degree of polymerization, heat transfer and so forth. The solids content (after removal of water) of the resulting latex, thus, may vary from about 25 to 50% by weight, and the pH can be from about 7.5 to 11.5.

Stabilizers, antioxidants and chelating agents may be used during polymerization. Also shortstops in free radical polymerization are well known. They are not only used to stop the polymerization in the reactor at the desired conversion but also to prevent further polymerization, cross-linking etc., during stripping, work-up and so forth. Examples of some shortstops are hydroquinone, sodium sulfide, hydroxyl ammonium acid sulfate, hydroxyl ammonium sulfate, sodium diethyl dithiocarbamate, diethylhydroxylamine, sodium dimethyl dithiocarbamate, potassium dimethyl dithiocarbamate, dimethylammonium dimethyldithiocarbamate, hydroxylamine sulfate plus sodium hydrosulfite and so forth.

Temperatures used during polymerization should be sufficient to effect polymerization by activation of the catalyst and double bonds of the monomers. They should not be too high to cause a run-away reaction and not too low to retard polymerization. In general, the temperature may be from about 2° to 90° C. If even lower temperatures are used, it may be desirable to add an inert, water soluble anti-freeze material to the polymerization media.

Polymerization should preferably be conducted in a closed reactor, such as a pressure reactor, fitted with a stirrer or other agitating means, heating and cooling means, with means to flush with or pump in an inert gas such as nitrogen, helium, argon, neon and the like in order to polymerize preferably under inert or non-reactive conditions, with means to charge the monomers, water, catalysts and so forth, venting means, and with means to recover the polymer and so forth. The reactor should be cleaned or flushed out between polymerization runs to remove traces of shortstops, catalysts, modifier, residues and so forth which might interfere with subsequent polymerizations. There should be sufficient agitation or stirring of the polymerization media to ensure thorough mixing, diffusion, contact and so forth. All of the polymerization ingredients except the shortstop may be charged to the reactor at the same time, intermittently, incrementally or continuously. Also, the ingredients may be added separately or in a mixture.

Free radical aqueous emulsion copolymerization of dienes and vinyl monomers is well known to those skilled in the art. In this connection please see Bovey et al, "Emulsion Polymerization," Interscience Publishers, Inc., New York, 1955; Whitby et al, "Synthetic Rubber," John Wiley and Sons, Inc., New York, 1954; Schildknecht, "Vinyl and Related Polymers," John Wiley and Sons, Inc., New York, 1952 and "Encyclopedia of Polymer Science and Technology," Vol. 5 (1966), pages 801–859, Interscience Publishers, a division of John Wiley and Sons, Inc., New York.

The copolymers made by the emulsion copolymerization process discussed above include not only random, linear, and branched copolymers and the like but also graft polymers. The technique of polymerizing or copolymerizing one or more monomers in the presence of a polymer or a substrate, "grafting technique," is known and is frequently called graft polymerization or graft copolymerization. In this connection, please see "Copolymerization," High Polymers, Vol. XVIII, Ham, pages 323–324, 335–420 and 573, Interscience Publishers a division of John Wiley and Sons, New York, 1964; "Block and Graft Polymers" Burlant and Hoffman, Reinhold Publishing Corporation, New York, 1960; "Block and Graft Copolymers," Ceresa, Butterworth and Co. (Publishers) Ltd., London, 1962; and "Graft Copolymers," Polymer Reviews, Vol. 16, Battaerd and Tregear, Interscience Publishers, a division of John Wiley and Sons, New York, 1967. Block copolymers, also, may be prepared in water by using certain azoamidino compounds which have surfactant properties and also act as free radical catalysts, optionally with an added emulsifying agent, as shown by U.S. Pat. No. 3,914,340.

While the above blend of the carboxylated copolymer latex and the acrylate copolymer latex can be used alone for the dip, it is preferred to employ a compounded latex blend. In other words, it is preferred to compound the latex blend with rubber fillers or extending agents along with the desired rubber stabilizers including chelating and/or sequestering agents, wetting or dispersing agents, suspending agents, defoamers, antisticking agents, antioxidants, bactericides, and the like to provide a stable, filled, compounded latex blend composition which has good covering power and which provides a nontacky, nonsticky or releasable, but adherent coating, film and/or layer on a hot tacky rubbery substrate when dried. Some latex compounding ingredients are shown by "Materials, Compounding Ingredients and Machinery for Rubber," "Rubber World" publication, 1977, Bill Communications, Inc., New York.

The fillers which are desirably added to the latex blend to extend it are nonblack, inorganic rubber compounding pigments or fillers. The fillers, also, may help as antisticking agents and may serve to thicken the latex as well as to modify the viscosity of the latex. The filler should be finely divided. Examples of fillers are calcium carbonate, clay, precipitated hydrated silica, fumed silica, mica, barytes, perlite, magnesium silicate or talc, feldspar, hydrous calcium magnesium silicate, magnesium carbonate, magnesium oxide, titanium dioxide, and the like and mixtures of the same. Of these materials it is preferred to use calcium carbonate, clay, fumed silica or hydrated precipitated silica and mixtures thereof. These fillers are used in an amount necessary to provide the desired extension, thickening, vicsosity and/or additional antisticking properties for the latex and to reduce cost. Too large an amount should be avoided since the rubber particles of the latex (rubber dispersion or suspension) blend on drying will not be present in sufficient amount to form a film and to bind all of the filler particles together to the substrate. In general the amount of filler can vary from about 100 to 1,000 parts by weight per 100 parts by weight total of dry copolymers (from the latex blend).

The other, as mentioned above, latex compounding ingredients (besides the pigments) are used in a minor amount by weight as compared to the copolymers (dry basis). They are desired (for example, in addition to any stabilizers, emulsifiers etc., used during polymerization) to further stabilize the latex blend in view of the addition of the fillers. These other compounding ingredients may provide more than one function in the latex, e.g., they may act as dispersing agents as well as wetting agents. In general, these other compounding ingredients such as stabilizers and wetting agents are used in an amount of from about 1 to 30 parts by weight per 100 parts by weight total of the copolymers of the latex blend on a dry basis. Examples of some of these other latex compounding ingredients are, if needed, antifoaming or defoaming agents such as polyalkyleneether glycols, triols and tetrols, 2,4,7,9-tetramethyl-5-decyn-4, 7-diol, Defoamer Y-250 (blend of emulsifiable mineral oil, silica derivatives and esters, Drew Chemical Corp.), and the like. Examples of some stabilizing, dispersing and wetting agents are sodium linoleate, octylphenoxy polyethoxy ethanol, polyoxypropylene oxyethylene glycol, casein, alkyl aryl sulfonates, sodium dioctyl sulfosuccinate, sodium salt of polymerized alkyl naphthalene sulfonate, sodium stearate, and nonyl phenol and the like and mixtures thereof. Examples of some suspending and organic thickening agents are ammonium polyacrylate, sodium polyacrylate, hydroxyethyl cellulose, potassium alginate, polysaccharides, sodium alginate and the like and mixtures thereof. Examples of some antisticking agents are zinc stearate, saponified fatty acids and so forth.

The heat sensitizer is required so that the blend of the latices of the copolymers will form a film (coagulate or gel) at the desired temperature, e.g., on contacting the hot rubber stock. The heat sensitizer, also, acts to form (accelerate) a stronger film faster at a given temperature and thus reduces time of processing. Examples of heat sensitizers are the zinc amine system, polyvinyl methyl ether, polypropylene glycol, 2-nitro-2-methyl-1-propanol and so forth. Polyoxy propylene oxyethylene glycols and similar alkylene oxide polyols, also, may act as heat sensitizers. The heat sensitizer is used in a minor amount by weight dry as compared to the polymer of the latex sufficient to gel or coagulate the polymers. Preferably, there are used about 0.75 to 15 parts by weight of the sensitizer to 100 parts by weight total of the copolymers in the latex blend on a dry weight basis. Mixtures of heat sensitizers can be used.

Minor amounts by weight of latices of other polymers and copolymers may be added to the latex blend of the carboxylated copolymer and the acrylate copolymer provided they do not adversely affect the properties of the carboxylated copolymer latex, the acrylate copolymer latex, the latex blend of the carboxylated copolymer and acrylate copolymer and/or the rubber stock which is treated with the latex blend.

For more information on methods of compounding and treating latex or latices see "Latex In Industry," Noble, 2nd Ed. 1953, Rubber Age, Palmerton Publishing Co., New York and "High Polymer Latices," Blackley, 1966, Vols. 1 and 2, Maclauren and Sons Ltd., London.

The amount of water used in making or added to the compounded latex will depend on the desired viscosity, handling characteristics of the compounded latex, the thickness of the film which it is desired to lay down on the rubber substrate and the time required for drying and film formation. Thin films and low viscosity compounded latices are desirable; however, these properties may vary considerably with needs, coating equipment, storing, pumping, speeds of coating, drying times and temperatures, film thickness and so forth. In general, the total solids content in the aqueous compounded latex blend may be from about 7 to 75%, preferably from about 7 to 40%, by weight. Deionized or distilled water should be used as the diluent to avoid introducing extraneous ions which might cause instability to the latex, resulting film and so forth.

The compounded aqueous latex blend dip may be applied to the rubber substrate by dipping, spraying, roller coating, painting or by any means which will provide a suitable coating. Thin coatings are preferred since they will gel and dry in a short time. On the other hand, while thick coatings may be used, only the surface layers nearest to or adjacent the rubber stock may be gelled in sufficient time so that the bulk of the coating may be washed off during the subsequent water (spray or dip) cooling step. Moreover, excess dip coating may require further compounding of the rubber stock itself to overcome the effects of the dip coating if the rubber compound is further mixed with curing agents such as sulfur and rubber accelerators. In general, not over about 7%, preferably not over about 2%, by weight dry of the dried latex composition from the dip on the rubber stock substrate will be enought to prevent sticking.

While the dip of the present invention can be applied to any polymeric surface and heated to prevent sticking of the surfaces, it is particularly applicable to rubber stocks which have been Banburyed, masticated, milled or which are freshly mixed and hot so that their surfaces are sticky or tacky. The stocks may be in the form of milled, masticated or broken down rubber, partially or fully compounded with carbon black, zinc oxide, stearic acid, silica, extender oil, styrenated phenol antioxidant, sulfur, and so forth. Examples of the rubber polymers which may be used in the stocks are natural rubber, polyisoprene, polybutadiene, butadiene-styrene copolymer, butadiene-acrylonitrile copolymer, butadiene styrene-acrylonitrile copolymer, butadiene-acrylic ester copolymer, polychloroprene, ethylene-propylene-non-conjugated diene copolymers (EPDM), isobutylene-isoprene copolymers (butyl), chlorinated butyl, brominated butyl and the like and mixtures thereof. While the process of the present invention is particularly useful for treating hot rubber which has just been Banburyed and passed through a sheeting mill to form a continuous hot sheet or slab, it will be appreciated that it can apply to any milled, extruded, calendered, laminated or warmed, tacky rubber stocks to prevent the rubber stocks from sticking together when piled, shelved or stored awaiting subsequent processing, e.g., in the manufacture of tires, belts and so forth. Moreover, while the dip of the present invention is useful with slab, strip or sheet rubber stock, especially in continuous form, it also, can be used on separate pieces, formed or not, or in the form of powders, pellets, crumb or particles and so forth to prevent them from sticking together.

As an illustration of the use of the present invention the hot (about 90°–150° C.) masticated rubber stock from the Banbury is passed through a sheeting mill to form a continuous hot sheet or slab and the continuous hot slab is dipped in a dip tank containing the latex blend slab dip composition of this invention for about 1 second or so and is then allowed to air dry for 30 to 60 seconds or until at least about 80% of the water has evaporated (preferably all the water should evaporate) and the heat sensitizer in the latex has caused the copolymers in the latex blend to coagulate or gel. Excess dip should be drained or removed to avoid formation of a film which may retain water. The gelled latex composition coated slab is then sprayed with water for about 30 to 40 seconds to cool it down without removing the latex blend coating composition and then air dried and stacked at a lay down temperature of about 50° C. maximum, preferably of about 45° C. maximum, (to prevent scorch) to form stacks or layers of rubber which do not stick together. During the air drying step and/or the water spraying step the rubber sheet or slab may be carried on a series of rotating shafts with long loops between the shafts (festooned) to save space. Water spraying is a more efficient method of cooling rubber stocks than air cooling. With increased cooling capability, the throughput of mixed rubber stocks can be increased substantially without scorching.

Since the blend of the carboxylated copolymer latex and the acrylate copolymer latex may be sensitive to extraneous ions such as metallic cations which may cause it to coagulate or cause the precipitation of soaps, the dipping tank and piping, stirrers, pumps and so forth which may be used in connection with a dip tank should preferbly contain a protective coating such as an epoxy resin, glass etc. and chelators and/or sequestering agents should preferably be added to the latex blend dip etc. Examples of chelating or sequestering agents are ethylene diamine tetraacetic acid and the hydrates, hydrated esters and ammonium, sodium and calcium-sodium salts thereof. The chelating agent may be used in an amount of from about 0.25 to 1.75 parts per 100 parts by weight total of the carboxylated copolymer and the acrylate copolymer on a dry weight basis. If stirring or agitating means are available and used continuously or when needed, filler suspending agents for the filled latex may not be necessary. The slab dip should not be subjected to extremes of temperature and evaporation during storage to avoid coagulation.

The following example will serve to illustrate the present invention with more particularity to those skilled in the art. In the example, parts are parts by weight unless otherwise indicated.

EXAMPLE

The following slab dip formulation was prepared:

| | Parts by Weight | | |
|---|---|---|---|
| Ingredient | Wet | Dry | % (Wet Total) |
| Carboxylated copolymer latex | 15 | 7.5 | 1.80 |
| Acrylate copolymer latex | 5.1 | 2.55 | 0.61 |
| Clay | 30.0 | 30.0 | 7.20 |
| Zinc Stearate | 0.2 | 0.2 | 0.048 |
| TRITON CF-32 (95% solids in water) | 1.02 | 1.0 | 0.24 |
| SEQUESTRENE NA-3 | 0.1 | 0.1 | 0.024 |
| TAMOL 960 (40% solids in water) | 0.25 | 0.1 | 0.024 |
| 2-NMP | 0.2 | 0.2 | 0.048 |
| Water | 364.63 | (374.85) | 90.0 |
| Total | 416.5 | 41.65 | 99.994 |

The above ingredients were mixed as follows:

| Cumulative Time, minutes | Addition of Ingredients |
|---|---|
| 0 | Water, Carboxylated copolymer latex, TRITON CF-32, TAMOL 960, 2-NMP, and SEQUESTRENE NA-3 (stir mixture) |
| 2 | Acrylate copolymer latex (continue stirring) |
| 10 | Clay and Zinc Stearate |

Complete dispersion or solution should occur in 15 minutes of total mixing time, and the dip should be agitated continuously to maintain dispersion of the clay during use.

Rubber compounds, samples or stocks used to test the above slab dip included unvulcanized masticated natural rubber gum stocks and unvulcanized masticated natural rubber-carbon black filled stocks, both milled in the laboratory prior to dipping to provide a hot fresh rubber surface.

Then the hot freshly milled rubber samples were dipped in a bath of the above latex slab dip composition for about 1 second, dried in air at about 25° C. for about 60 seconds, cooled in a water spray at about 25° C. for 30 seconds, and then dried in air for 60 seconds and stacked.

The stacked rubber layers (stacking) was made to simulate conditions in production. Two samples coated with the dried gelled slab dip were stacked on top of each other and about 2 psi was applied using a special bladder mold in a press. The press was heated to about 43°–54.5° C. Samples were treated this way for as long as three days before they were taken out for observation. The conditions of simulated stacking are actually much more severe than in production. In production a regular batch weighing about 1800 lbs., when folded and stacked in the normal way, probably experiences about 1 psi of pressure, particularly those confined to the bottom of the stack. The temperature of the stock during laydown is not supposed to exceed about 50° C.

The coated samples did not stick together in the heated bladder mold test, e.g., they could be peeled apart at the end of the test. The dried slab coatings were not removed on treatment with water.

The above dip was successfully used in preventing calendered sheeting of an EPDM roofing compound from sticking to itself before and after autoclave curing.

The above dip exhibits minimal foaming.

Further Testing of New Dip

1. Dusting Level

In order to evaluate the dusting tendency of the dip, a simple tape test was used. It consisted of pressing an adhesive tape firmly onto the rubber samples coated with the dried slab dip. The amount of materials picked up by the tape on peeling provided an indication of the dusting tendency. Random taping of the rubber surfaces was done at six different locations, each time using a new tape. The tapes (SCOTCH 810) used measured approximately 2.5 cm × 1.2 cm. The rubber stock used was a tire belt rubber skim compound or stock. The dusting test was done on dried dipped stocks, with and without water spray. In the case of dip A which does not resist removal by water spray, spraying time was limited only to a few seconds. The results are summarized in Table I, below.

The results clearly indicate the much reduced dusting tendency of the B and C dips relative to dip A. The difference in dust pick-up between the B and C dips can be accounted for by the presence of zinc stearate in the B dip and not the C dip.

TABLE I

| | Dusting Tendency of Slab Dips | | | | | |
|---|---|---|---|---|---|---|
| Dip | Without Water Spray | | With Water Spray | | Combined Data | |
| Identification | % | σ | % | σ | % | σ |
| A | 2.19 | 0.34 | 0.83 | 0.91 | 1.58 | 0.78 |
| B | 0.73 | 0.44 | 0.79 | 0.41 | 0.76 | 0.41 |
| C | 0.44 | 0.47 | 0.45 | 0.42 | 0.45 | 0.43 |

A - Basically a high soap solution with low filler and no polymer.
B - Above slab dip.
C - Above slab dip without TAMOL 960 and zinc stearate.
σ - Standard deviation.

2. Effect of Dip on Adhesion Between Rubber and Wires

The effect of the above dried slab dip (B) on the adhesion between the tire belt rubber skim stock and brass-coated steel wire tire cords was evaluated. Three different samples were made, namely, remilled control stock, stock coated with above slab dip (B) and remilled stock coated with the new dip (B) and not remilled. In the non-remilled dipped stock case, the wires were in direct contact with the dip coating. In all three cases, the effect of heat aging on adhesion was also evaluated by subjecting half of the samples to 49° C. (120° F.) for two days prior to testing. The adhesion results are described in Table II below:

TABLE II

| | ASTM-D2229 Adhesion Test Results | | | | | |
|---|---|---|---|---|---|---|
| | Unaged Samples | | Aged Samples | | Combined Data | |
| Sample Description | kN | σ | kN | σ | kN | σ |
| Rubber stock remilled | 0.45 | 0.04 | 0.43 | 0.06 | 0.443 | 0.051 |
| Rubber stock dipped with above slab Dip (B) and remilled | 0.42 | 0.07 | 0.45 | 0.05 | 0.438 | 0.064 |
| Rubber stock dipped with above slab Dip (B) without remilling | 0.23 | 0.01 | 0.26 | 0.03 | 0.249 | 0.0289 | kN - Kilo Newton
σ - standard deviation

Three important facts are evident in these results, namely:

(1) The dip, when dispersed thoroughly in the rubber matrix, does not affect rubber/wire adhesion.

(2) The dip, if not properly dispersed in the rubber matrix, will adversely affect the rubber/wire adhesion.

(3) Heat aging under the given conditions does not affect rubber/wire adhesion.

Based on these findings, it is essential to remill the dipped rubber stocks thoroughly in order to maintain proper adhesion between the rubber and wire.

180° peel specimens were also made from the rubber belt skim compounds coated with different dips (but with no remilling). The specimens were cured 30 minutes at 148.9° C. The observations of the 180° peel test are described below.

| Dip Identification | Nature of Peel Failure |
|---|---|
| Control (no dip) | Cohesive in rubber |
| Dip (A), above | Clean separation at the dip interface |
| Dip of soap solution, clay and bentonite, no polymer | Clean separation at the dip interface |
| Above slab dip (B) | Clean separation at the dip interface |

This series of findings once again point out the importance of proper remilling the dip into the rubber matrix, regardless of the nature of the dip.

3. Effect of Dip on Vulcanizate Properties

Properly remilled rubber samples or stocks containing the slab dip (B) were examined for Mooney viscosity #, stress-strain properties and Monsanto fatigue. The results are shown in Table III, below. The calculated and theoretical F ratios at 95% confidence levels are also included in the table. When the calculated F ratio is more than twice the theoretical value, the event is significant. Based on this consideration, the dip does not cause any change in the properties of the rubber vulcanizates.

TABLE III

| | Effect of Dip On Vulcanizate Properties | | | | | |
|---|---|---|---|---|---|---|
| | Control (No Dip) | | With Above Slab Dip (B) | | F Ratio | |
| | | | | | Calculated | From Statistical* |
| Property | Mean Value | σ | Mean Value | σ | Based On Data | Table |
| ML-1 + 4 at 100° C. # | 62 | | 63 | | — | — |
| Shore A 10% | 68 | | 67 | | — | — |

TABLE III-continued

| | Effect of Dip On Vulcanizate Properties | | | | | |
|---|---|---|---|---|---|---|
| | Control (No Dip) | | With Above Slab Dip (B) | | F Ratio | |
| Property | Mean Value | σ | Mean Value | σ | Calculated Based On Data | From Statistical* Table |
| Modulus (MPa) 100% | 0.39 | 0.02 | 0.40 | 0.01 | 2.33 | 6.61 |
| Modulus (MPa) 300% | 2.33 | 0.05 | 2.35 | 0.06 | 0.13 | 6.61 |
| Modulus (MPa) | 9.22 | 0.13 | 8.95 | 0.07 | 13.09 | 6.61 |
| Tensile (MPa) | 19.81 | 0.45 | 19.47 | 0.27 | 1.37 | 6.61 |
| Elongation (%) | 576.7 | 14.5 | 594.0 | 17.3 | 1.96 | 6.61 |
| Monsanto fatigue to 100% ε, kc | 223.3 | 63.5 | 307.7 | 72.9 | 3.80 | 5.32 ($v_1 = 1$, $v_2 = 8$) |

*$v_1 = 1$, $v_2 = 5$; $v$ = degrees of freedom; 95% confidence
MPa - Mega Pascals
σ - standard deviation 4. Mechanical and Thermal Stability Test The above slab dip (B) remained unchanged in performance (no signs of phase separation) after being vigorously stirred for about two hours using a high-speed blender. In thermal aging, some of the above slab dip (B) was placed in capped containers and aged for more than two weeks at 71.1° C. (160° F.). The aged dips still performed as well as the unaged slab dip (B) in providing a water resistant non tacky coating on a hot rubber substrate as described supra.

Notes for the Example

Carboxylated copolymer latex: Aqueous emulsion free radical polymerized high molecular weight copolymer of about 64% by weight of styrene, about 2% by weight total of a mixture of itaconic acid and methacrylic acid, and the balance butadiene-1,3. About 50% by weight solids, pH of 9. Brookfield LVF viscosity #2 spindle @ 60 rpm of 60 to 90. Tg of about −15.9° C. by Differential Thermal Analysis and Tg of about −10.2° C. by Differential Scanning Calorimetry.

Acrylate copolymer latex: Aqueous emulsion polymerized copolymer of about 65% by weight of ethylacrylate, about 30% by weight of methyl methacrylate and about 5% by weight of acrylamide. Contains synthetic anionic emulsifier. About 50.5% solids, pH of 2.5. Tg of +45° C. Brookfield Viscosity (centipoises) Spindle No. 1, 60 rpm, of 140.

TRITON CF-32: Amine polyglycol condensate, non-ionic, cloud point of 25° C., pH of 10. Low foam emulsifier and stabilizer. Rohm and Haas Co.

SEQUESTRENE NA-3: Trisodium ethylene diamine tetra acetate dihydrate. Chelating agent. Ciba-Geigy Corp.

TAMOL 960: Sodium salt of a carboxylated acrylic polymer, pH of 7.0. Dispersing agent. Rohm and Haas Co.

2-NMP: 2-Nitro-2-methyl-1-propanol. Water max. 0.5% by wt. Free formaldehyde max. 0.04% by wt. Melting point (min.) 80° C. IMC Chemical Group, Inc. Used as heat-sensitizing additive.

Zinc stearate: Water dispersible zinc stearate. Diamond Shamrock (Harwick Chem.).

I claim:

1. An aqueous composition of matter comprising a blend of two polymeric latices containing a minor amount by weight of a heat sensitizer sufficient to gel said composition on heating, (A) the polymer of one of said latices of said composition comprising a carboxylated copolymer of (1) at least 45% by weight of a monomer selected from the group consisting of styrene, vinyl toluene, acrylonitrile, methacrylonitrile, acrylamide, methacrylamide, methylmethacrylate and ethylmethacrylate and mixtures thereof, (2) a copolymerizable monomer selected from the group consisting of acrylic acid, methacrylic acid, ethacrylic acid, maleic acid, fumaric acid, itaconic acid, citraconic acid, sorbic acid and crotonic acid and mixtures thereof in an amount of up to 10% by weight and (3) the balance, in an amount sufficient to provide some flexibility to and for vulcanization of the copolymer, a copolymerizable monomer selected from the group consisting of butadiene-1,3, isoprene, 2,3-dimethyl-butadiene-1,3, and piperylene and mixtures thereof, said copolymer of (A) having a glass transition temperature of not less than about −30° C., and (B) the polymer of the other of said latices of said composition consisting essentially of a copolymer of (1) from about 50 to 70% by weight of at least one acrylate selected from the group consisting of methyl acrylate and ethyl acrylate. (2) from about 25 to 40% by weight of at least one alkacrylate selected from the group consisting of methyl methacrylate, ethyl methacrylate and methyl ethacrylate and (3) from about 3 to 7% by weight of acrylamide, said copolymer of (B) having a glass transition temperature of not less than about +30° C., the parts by weight ratio of the copolymer of (A) to the copolymer of (B) being from about 50:50 to 85:15 on a dry basis.

2. A composition according to claim 1 containing additionally, based on 100 parts by weight total dry of the copolymer of (A) and the copolymer of (B), from about 100 to 1000 parts by weight of inorganic, non-black rubber compounding pigments, from about 1 to 30 parts by weight of stabilizers and wetting agents, from about 0.75 to 15 parts by weight of said heat sensitizer and from about 0.25 to 1.75 parts by weight of a chelating agent and the total solids content of said composition being from about 7 to 75% by weight.

3. A composition according to claim 2 in which the total solids of said composition is from about 7 to 40% by weight, in which the copolymer of (A) is a copolymer of about 64% by weight of styrene, about 2% by weight total of itaconic acid and methacrylic acid and the balance butadiene-1,3, said copolymer of (A) having glass transition temperatures of about −15.9° C. by Differential Thermal Analysis and of about −10.2° C. by Differential Scanning Calorimetry and in which the copolymer of (B) is a copolymer of about 65% by weight of ethyl acrylate, about 30% by weight of methyl methacrylate and about 5% by weight of acrylamide, said copolymer of (B) having a glass transition temperature of +45° C.

* * * * *